(12) United States Patent
Jungkamp et al.

(10) Patent No.: US 7,407,643 B2
(45) Date of Patent: *Aug. 5, 2008

(54) PROCESS FOR REMOVING WATER FROM A MIXTURE CONTAINING WATER AND ZINC CHLORIDE

(75) Inventors: Tim Jungkamp, Sandhausen (DE); Jens Scheidel, Hirschberg (DE); Hermann Luyken, Ludwigshafen (DE); Michael Bartsch, Neustadt (DE); Robert Baumann, Mannheim (DE); Gerd Haderlein, Grünstadt (DE)

(73) Assignee: BASF SE (DE)

( * ) Notice: Subject to any disclaimer, the term of this patent is extended or adjusted under 35 U.S.C. 154(b) by 643 days.

This patent is subject to a terminal disclaimer.

(21) Appl. No.: 10/519,513

(22) PCT Filed: Jul. 4, 2003

(86) PCT No.: PCT/EP03/07149

§ 371 (c)(1),
(2), (4) Date: Dec. 23, 2004

(87) PCT Pub. No.: WO2004/007371

PCT Pub. Date: Jan. 22, 2004

(65) Prior Publication Data

US 2005/0207968 A1 Sep. 22, 2005

(30) Foreign Application Priority Data

Jul. 10, 2002 (DE) ................. 102 31 296

(51) Int. Cl.
*C01B 9/02* (2006.01)
(52) U.S. Cl. ..................................... 423/491
(58) Field of Classification Search ................ 423/491
See application file for complete search history.

(56) References Cited

U.S. PATENT DOCUMENTS 3,496,215 A   2/1970   Drinkard et al.
3,766,241 A   10/1973  Drinkard
3,773,809 A   11/1973  Walter
4,705,881 A   11/1987  Rapoport
7,084,294 B2 * 8/2006  Jungkamp et al. ........... 558/338

FOREIGN PATENT DOCUMENTS

| EP | 0 268 448 | 5/1988 |
| EP | 0 732 922 | 6/1990 |
| GB | 469352 | 7/1937 |
| WO | WO-97/23446 | 7/1997 |
| WO | WO-00/38813 | 7/2000 |

OTHER PUBLICATIONS

*Ullman's Encyclopedia of Industrial Chemistry*, vol. 33, 5th Ed. VCH Verlagsgesellschaft, Wenheim, 1988, pp. 6-16 to 6-22.
B. R. Eichbaum et al., Report of Investigations No. 9347 (RI 9347) "Method for Recovering Anhydrous ZnCl2 from Aqueous Solutions" United States Dept. of the Interior, Bureau of Mines: 1-10 (1991).
*Advanced Organic Chemistry Reactions, Mechanisms, and Structure*, Second Edition, pp. 330-337 (reprint 1984) (1977).
Kirk-Othmer, *Encyclopedia of Chemical Technology*, Third edition, vol. 7, pp. 870-881 (1979).
*Ullmann's Encyclopedia of Industrial Chemistry*, Fifth, Completely Revised Edition, vol. B3: Unit Operations II, pp. 2-22 - 2-6, (1988).

* cited by examiner

*Primary Examiner*—James O. Wilson
*Assistant Examiner*—Ebenezer Sackey
(74) *Attorney, Agent, or Firm*—Connolly Bove Lodge & Hutz LLP

(57) ABSTRACT

A process for the removal of water from a mixture comprising water and zinc chloride, which comprises adding to said mixture comprising water and zinc chloride an aprotic, polar diluent
  whose boiling point in the case where an azeotrope is not formed between said diluent and water under the pressure conditions of the distillation mentioned below is higher than the boiling point of water and which is in liquid form at this boiling point of water or
  which forms an azeotrope or heteroazeotrope with water under the pressure and temperature conditions of the distillation mentioned below, and
  distilling the mixture comprising water, zinc chloride and the diluent with removal of water or said azeotrope or said heteroazeotrope from this mixture, giving an anhydrous mixture comprising zinc chloride and said diluent.

20 Claims, No Drawings

PROCESS FOR REMOVING WATER FROM A MIXTURE CONTAINING WATER AND ZINC CHLORIDE

RELATED APPLICATION

This application is a national stage application (under 35 U.S.C. 371) of PCT/EP2003/007149 filed Jul. 4, 2003 which claims benefit to German application Serial No. 102 31 296.6 filed Jul. 10, 2002.

The present invention relates to a process for the removal of water from a mixture comprising water and zinc chloride, which comprises adding to said mixture comprising water and zinc chloride an aprotic, polar diluent whose boiling point in the case where an azeotrope is not formed between said diluent and water under the pressure conditions of the distillation mentioned below is higher than the boiling point of water and which is in liquid form at this boiling point of water or which forms an azeotrope or heteroazeotrope with water under the pressure and temperature conditions of the distillation mentioned below, and distilling the mixture comprising water, zinc chloride and the diluent with removal of water or said azeotrope or said heteroazeotrope from this mixture, giving an anhydrous mixture comprising zinc chloride and said diluent.

Anhydrous zinc chloride or anhydrous mixtures comprising a liquid diluent and zinc chloride are industrially important starting compounds which are used, inter alia, in electroplating technology in the zinc-plating of metallic materials or, owing to the Lewis acid properties of the zinc chloride, as catalyst or catalyst constituent.

After these uses, the known problem arises of recovering the zinc chloride from the mixture obtained after the use in a form such that it can be re-used industrially, usually in the form of anhydrous zinc chloride or anhydrous mixtures comprising a liquid diluent and zinc chloride.

This recovery usually gives mixtures which comprise water as well as zinc chloride.

A particular difficulty consists in recovering anhydrous zinc chloride or anhydrous mixtures comprising a liquid diluent and zinc chloride from mixtures of this type, as is known, for example, from Report of Investigations No. 9347, "Method for Recovering Anhydrous $ZnCl_2$ from Aqueous Solutions", B. R. Eichbaum, L. E. Schultze, United States Department of the Interior, Bureau of Mines, 1991, pages 1-10, ("RI 9347").

Owing to the high solubility of zinc chloride in water, concentration of aqueous zinc chloride solutions gives a highly viscous mother liquor which is very difficult to filter in order to remove precipitated zinc chloride from the mother liquor.

Thus, RI 9347, page 4, Table 1, discloses that unknown by-products are obtained in addition to zinc chloride on drying of zinc chloride at 70° C./60 days or at 150° C./8 days. Furthermore, the drying times quoted are uneconomically long for recovery of zinc chloride.

According to RI 9347, page 4, Table 2, the attempt to obtain zinc chloride by spray-drying a zinc chloride solution at 100° C. under air does not give a powder, but instead a moist slurry.

The literature cited in RI 9347 on page 2 and RI 9347 itself propose liberating zinc chloride from an aqueous solution with addition of ammonia or ammonium chloride, giving a zinc diamine dichloride complex, from which zinc chloride is liberated.

As is evident from RI 9347, this process does not give a pure zinc diamine dichloride complex, but instead a zinc diamine dichloride complex which is contaminated with various oxy or hydroxy compounds of zinc.

In addition, RI 9347 describes on page 8, right-hand column, that the liberation of zinc chloride from the zinc diamine dichloride complex does not take place to completion at temperatures up to 400° C.; at temperatures above 400° C., explosive mixtures are disadvantageously obtained, attributable to decomposition of the ammonia.

It is an object of the present invention to provide a process which enables the removal of water from a mixture comprising water and zinc chloride in a technically simple and economical manner.

We have found that this object is achieved by the process defined at the outset.

In the process according to the invention, water is removed from a mixture comprising water and zinc chloride.

The mixing ratio of water to zinc chloride in the starting mixture is not crucial per se. With increasing ratio of zinc chloride to water, the viscosity of the mixture increases significantly, making handling of the mixture increasingly complex.

A proportion of zinc chloride, based on the total weight of zinc chloride and water, in the region of at least 0.01% by weight, preferably at least 0.1% by weight, particularly preferably at least 0.25% by weight, especially preferably at least 0.5% by weight, has proven advantageous.

A proportion of zinc chloride, based on the total weight of zinc chloride and water, in the region of at most 60% by weight, preferably at most 35% by weight, particularly preferably at most 30% by weight, has proven advantageous.

The starting mixture can consist of zinc chloride and water.

Besides zinc chloride and water, the starting mixture may comprise further constituents, such as ionic or nonionic, organic or inorganic compounds, in particular those which are homogeneously miscible with the starting mixture to form a single phase or are soluble in the starting mixture.

In a preferred embodiment, it is possible to add an inorganic or organic acid. Preference is given to the use of acids which have a boiling point under the distillation conditions in the process according to the invention which is lower than the boiling point of the aprotic, polar diluent. Particular preference is given to hydrohalic acids, such as HF, HCl, HBr or HI, in particular HCl.

The amount of acid can advantageously be selected in such a way that the pH of the mixture comprising water and zinc chloride is less than 7.

The amount of acid can advantageously be selected in such a way that the pH of the mixture comprising water and zinc chloride is greater than or equal to 0, preferably greater than or equal to 1.

Starting mixtures of this type can advantageously be obtained by extraction with a water-containing extractant, in particular with water, of a reaction mixture which has been obtained in the hydrocyanation of pentenenitrile in the presence of a catalyst system comprising Ni(0), one or more phosphorus-containing ligands and zinc chloride, to give adiponitrile.

The preparation of a reaction mixture of this type is known per se, for example from U.S. Pat. No. 4,705,881. According to U.S. Pat. No. 3,773,809, the catalyst can be removed from the reaction mixture by extraction, for example with cyclohexane, with the zinc chloride that remains in the product stream comprising the predominant proportion of the adiponitrile. In order to obtain pure adiponitrile, the zinc chloride can be removed from a product stream of this type in a manner known per se by reaction with ammonia, as described, for example, in U.S. Pat. No. 3,766,241.

The extraction can advantageously be carried out under conditions under which the extractant and the reaction mixture are in the form of two phases.

If water is employed as extractant, temperatures of at least 0° C., preferably at least 5° C., in particular at least 30° C., have proven advantageous.

If water is employed as extractant, temperatures of at most 200° C., preferably at most 100° C., in particular at most 50° C., have proven advantageous.

This gives rise to pressures in the range from $10^{-3}$ to 10 MPa, preferably from $10^{-2}$ to 1 MPa, in particular from $5*10^{-2}$ to $5*10^{-1}$ MPa.

The phase separation can be carried out in a manner known per se in apparatuses described for such purposes, as are known, for example, from: Ullmann's Encyclopedia of Industrial Chemistry, Vol. B3, 5th Edn., VCH Verlagsgesellschaft, Weinheim, 1988, pages 6-14 to 6-22.

The optimum apparatuses and process conditions for phase separation can easily be determined here through some simple preliminary experiments.

In accordance with the invention, an aprotic, polar diluent whose boiling point under the pressure conditions of the distillation mentioned below is higher than the boiling point of water and which is in liquid form at this boiling point of water is added to said mixture comprising water and zinc chloride. The addition of water to said mixture can be carried out before the distillation or during the distillation.

The pressure conditions for the subsequent distillation are not crucial per se. Pressures of at least $10^{-4}$ MPa, preferably at least $10^{-3}$ MPa, in particular at least $5*10^{-3}$ MPa, have proven advantageous.

Pressures of at most 1 MPa, preferably at most $5*10^{-1}$ MPa, in particular at most $1.5*10^{-1}$ MPa, have proven advantageous.

Depending on the pressure conditions and the composition of the mixture to be distilled, the distillation temperature then becomes established.

At this temperature, the aprotic, polar diluent is, in accordance with the invention, in liquid form. For the purposes of the present invention, the term aprotic, polar diluent is taken to mean both a single diluent and also a mixture of diluents of this type, where, in the case of a mixture of this type, said physical properties according to the invention relate to this mixture.

Furthermore, the aprotic, polar diluent has, in accordance with the invention, a boiling point under these pressure and temperature conditions which, in the case where an azeotrope is not formed between the diluent and water, is higher than that of water, preferably by at least 5° C., in particular at least 20° C. and preferably at most 200° C., in particular at most 100° C.

Aprotic, polar organic and inorganic diluents are known per se, for example from: Jerry March, Advanced Organic Chemistry, 2nd Edn., McGraw-Hill, International Student Edition, Hamburg, 8th reprint (1984), 1977, pp. 331-336; Organikum, 2nd reprint of the 15th Edition, VEB Deutscher Verlag der Wissenschaften, Berlin, 1981, pp. 226-227; Streitwieser/Heathcock, Organische Chemie, Verlag Chemie, Weinheim, 1980, p. 172.

Suitable are, for example, amides, in particular dialkylamides, such as dimethylformamide, dimethylacetamide, N,N-dimethylethyleneurea (DMEU), N,N-dimethylpropyleneurea (DMPU), hexamethylenephosphoric triamide (HMPT), ketones, sulfur-oxygen compounds, such as dimethyl sulfoxide, tetrahydrothiophene 1,1-dioxide, nitro aromatic compounds, such as nitrobenzene, nitroalkanes, such as nitromethane and nitroethane, ethers, such as diethers of diethylene glycol, for example diethylene glycol dimethyl ether, alkylene carbonates, such as ethylene carbonate, nitriles, such as acetonitrile, propionitrile, n-butyronitrile, n-valeronitrile, cyanocyclopropane, acrylonitrile, crotonitrile, allyl cyanide and pentenenitriles.

Aprotic, polar diluents of this type can be employed alone or in the form of a mixture.

Aprotic, polar diluents of this type may comprise further diluents, preferably aromatic compounds, such as benzene, toluene, o-xylene, m-xylene or p-xylene, aliphatic compounds, in particular cycloaliphatic compounds, such as cyclohexane or methylcyclohexane, or mixtures thereof.

In a preferred embodiment, it is possible to employ diluents which form an azeotrope or heteroazeotrope with water. The amount of diluent compared with the amount of water in the mixture is not crucial per se. It is advantageous to employ more liquid diluent than corresponds to the amount to be distilled off through the azeotropes, so that excess diluent remains as bottom product.

If use is made of a diluent which does not form an azeotrope with water, the amount of diluent compared with the amount of water in the mixture is not crucial per se.

Organic diluents are advantageously suitable, preferably those having at least one nitrile group, in particular one nitrile group.

In a preferred embodiment, the nitrile employed can be a saturated aliphatic nitrile or an olefinically unsaturated aliphatic nitrile. Particularly suitable are nitriles having 3, 4, 5, 6, 7, 8, 9 or 10, in particular 4, carbon atoms, calculated without the nitrile groups, preferably the nitrile group.

In a particularly preferred embodiment, the diluent employed can be an olefinically unsaturated aliphatic mononitrile selected from the group consisting of 2-cis-pentenenitrile, 2-trans-pentenenitrile, 3-cis-pentenenitrile, 3-trans-pentenenitrile, 4-pentenenitrile, E-2-methyl-2-butenenitrile, Z-2-methyl-2-butenenitrile, 2-methyl-3-butenenitrile or a mixture thereof.

2-cis-Pentenenitrile, 2-trans-pentenenitrile, 3-cis-pentenenitrile, 3-trans-pentenenitrile, 4-pentenenitrile, E-2-methyl-2-butenenitrile, Z-2-methyl-2-butenenitrile, 2-methyl-3-butenenitrile and mixtures thereof are known and can be obtained by processes known per se, such as by hydrocyanation of butadiene in the presence of catalysts, for example as described in U.S. Pat. No. 3,496,215, or the linear pentenenitriles by isomerization of 2-methyl-3-butenenitrile as described in WO 97/23446.

Particularly advantageous here are mixtures of said pentenenitriles which comprise 2-cis-pentenenitrile, 2-trans-pentenenitrile or mixtures thereof mixed with 3-cis-pentenenitrile, 3-trans-pentenenitrile, 4-pentenenitrile, E-2-methyl-2-butenenitrile, Z-2-methyl-2-butenenitrile, 2-methyl-3-butenenitrile or mixtures thereof. In mixtures of this type, a reduction in the concentration of 2-cis-pentenenitrile, 2-trans-pentenenitrile, E-2-methyl-2-butenenitrile, Z-2-methyl-2-butenenitrile, 2-methyl-3-butenenitrile or mixtures thereof takes place during the subsequent distillation since these form azeotropes with water which have a lower boiling point than the azeotropes of 3-cis-pentenenitrile, 3-trans-pentenenitrile, 4-pentenenitrile or mixtures thereof with water. In this embodiment, a mixture comprising 3-cis-pentenenitrile, 3-trans-pentenenitrile, 4-pentenenitrile or mixtures thereof and anhydrous zinc chloride is obtained after the distillation as product of the process according to the invention.

This product can advantageously be employed for further hydrocyanation in the presence of a catalyst to give adiponitrile. A reduction in the concentration of 2-cis-pentenenitrile, 2-trans-pentenenitrile, E-2-methyl-2-butenenitrile, Z-2-methyl-2-butenenitrile or 2-methyl-3-butenenitrile is advantageous in as much as these two compounds undergo said hydrocyanation to a considerably lesser extent than 3-cis-pentenenitrile, 3-trans-pentenenitrile, 4-pentenenitrile or mixtures thereof.

If the diluent employed is 2-cis-pentenenitrile, 2-trans-pentenenitrile, 3-cis-pentenenitrile, 3-trans-pentenenitrile, 4-pentenenitrile, E-2-methyl-2-butenenitrile, Z-2-methyl-2-butenenitrile, 2-methyl-3-butenenitrile or mixtures thereof, mixing ratios of pentenenitrile to the zinc chloride of at least 0.5 mol/mol, preferably at least 5 mol/mol, particularly preferably at least 15 mol/mol, have proven advantageous.

If the diluent employed is 2-cis-pentenenitrile, 2-trans-pentenenitrile, 3-cis-pentenenitrile, 3-trans-pentenenitrile, 4-pentenenitrile, E-2-methyl-2-butenenitrile, Z-2-methyl-2-butenenitrile, 2-methyl-3-butenenitrile or mixtures thereof, mixing ratios of pentenenitrile to the zinc chloride of at most 10,000 mol/mol, preferably at most 5000 mol/mol, particularly preferably at least 2000 mol/mol, have proven advantageous.

In accordance with the invention, the mixture comprising water, zinc chloride and the diluent is distilled with removal of water from this mixture, giving an anhydrous mixture comprising zinc chloride and said diluent.

In the case of pentenenitrile as diluent, the distillation can advantageously be carried out at a pressure of at most 200 kPa, preferably at most 100 kPa, in particular at most 50 kPa, and particularly preferably at most 20 kPa.

In the case of pentenenitrile as diluent, the distillation can advantageously be carried out at a pressure of at least 1 kPa, preferably at least 5 kPa, particularly preferably at 10 kPa.

The distillation can advantageously be carried out by one-step evaporation, preferably by fractional distillation in one or more, such as 2 or 3, distillation apparatuses.

The distillation can be carried out in apparatuses which are conventional for this purpose, as described, for example, in Kirk-Othmer, Encyclopedia of Chemical Technology, 3rd Ed., Vol. 7, John Wiley & Sons, New York, 1979, pages 870-881, such as sieve-tray columns, bubble-tray columns, packed columns, columns with side take-off or dividing-wall columns.

The distillation can be carried out batchwise.

The distillation can be carried out continuously.

For the purposes of the present invention, the term anhydrous zinc chloride is taken to mean zinc chloride having a water content, based on the total weight of zinc chloride and water, of less than 500 ppm by weight, preferably less than 50 ppm by weight and at least equal to 0 ppm by weight.

EXAMPLES

The % by weight or ppm by weight data given in the examples are based, unless stated otherwise, on the total weight of the respective mixture.

The Zn or zinc chloride content was determined by atomic emission spectrometry.

The chlorine content was determined by the Schoeniger method.

The water concentration was determined potentiometrically by titration by the Karl-Fischer method.

Example 1

In a continuously operated vacuum distillation column with metal mesh packing (type CY, Sulzer Chemtech, internal diameter Ø=50 mm, height 130 cm) with a thin-film evaporator as heat exchanger at the column bottom, a condenser operated at 30° C. at the top and a phase separation vessel cooled to 0° C. in the reflux, 240 g/h of a solution of 30% by weight of zinc chloride in trans-3-pentenenitrile having a water content of 0.4% by weight were metered into the distillation column above the mesh packing. At a pressure of p=10 kPa (absolute), a two-phase mixture was obtained as condenser distillate at 344 K. The upper phase, essentially consisting of trans-3-pentenenitrile, was fed back continuously to the top of the column. The lower phase essentially consisted of water and was continuously pumped out of the phase separation vessel. A homogeneous solution of $ZnCl_2$ in trans-3-pentenenitrile was separated off at 348 K at the bottom of the column. The water content in the bottom product had dropped to 76 ppm by weight of $H_2O$ after a distillation run time of 17 hours and to 50 ppm by weight after 41 hours.

Example 2

1 kg of trans-3-pentenenitrile and 500 g of water were added to 4 kg of the bottom product obtained in Example 1. The homogeneous mixture was metered into the distillation column operated as in Example 1 at a metering rate of 206 g/h.

After continuous operation for 24 hours, the bottom product comprised 350 ppm by weight of water, 16.9% by weight of chlorine, calculated as Cl, and 15.5% by weight of Zn, in each case based on the total weight of the solution; an experimentally found Cl:Zn ratio of 2.01 can be derived therefrom.

Gas-chromatographic analysis by derivatization with MSTFA (2,2,2-trifluoro-N-methyl-N-(trimethylsilyl)acetamide) showed no detectable quantities of the saponification product 3-pentenoic acid.

Analysis for polymeric degradation products by gel permeation chromatography showed no detectable quantities of polymeric product.

The zinc chloride solution in 3-pentenenitrile obtained in this way can be employed in the hydrocyanation of 3-pentenenitrile in the presence of nickel(0) phosphite catalysts and shows no difference in activity compared with a solution freshly prepared from 3-pentenenitrile and anhydrous zinc chloride.

We claim:

1. A process for the removal of water from a mixture comprising water and zinc chloride, which comprises
    adding to said mixture comprising water and zinc chloride an aprotic, polar diluent whose boiling point in the case where an azeotrope is not formed between said diluent and water is higher than the boiling point of water and which is in liquid form at this boiling point of water or which forms an azeotrope or heteroazeotrope with water, and
    distilling the mixture comprising water, zinc chloride and the diluent with removal of water or said azeotrope or said heteroazeotrope from this mixture, giving an anhydrous mixture comprising zinc chloride and said diluent, wherein the aprotic, polar diluent employed is an aliphatic, olefinically unsaturated nitrile selected from the group consisting of 2-cis-pentenenitrile, 2-trans-pentenenitrile, 3-cis-pentenenitrile, 3-trans-pentenenitrile, 4-pentenenitrile, E-2-methyl-2-butenenitrile, Z-2-methyl-2-butenenitrile, 2-methyl-3-butenenitrile or a mixture thereof.

2. A process as claimed in claim 1, wherein the diluent is able to form an azeotrope or heteroazeotrope with water under the distillation conditions.

3. A process as claimed in claim 1, wherein the mixture comprising water and zinc chloride has a pH of less than 7.

4. A process as claimed in claim 1, wherein the mixture comprising water and zinc chloride has a pH in the range from 0 to less than 7.

5. A process as claimed in claim 1, wherein an acid is added to the mixture comprising water and zinc chloride.

6. A process as claimed in claim 5, wherein the acid employed is HCl.

7. A process as claimed in claim 2, wherein the mixture comprising water and zinc chloride has a pH of less than 7.

8. A process as claimed in claim 7, wherein the mixture comprising water and zinc chloride has a pH in the range from 0 to less than 7.

9. A process as claimed in claim 8, wherein an acid is added to the mixture comprising water and zinc chloride.

10. A process as claimed in claim 9, wherein the acid employed is HCl.

11. A process as claimed in claim 1, wherein a proportion of zinc chloride, based on the total weight of zinc chloride and water, in the amount is at least 0.01% by weight.

12. A process as claimed in claim 1, wherein a proportion of zinc chloride, based on the total weight of zinc chloride and water, in the amount is at least 0.1% by weight up to 60% by weight.

13. A process as claimed in claim 1, wherein a proportion of zinc chloride, based on the total weight of zinc chloride and water, in the amount is at least 0.5% by weight up to 30% by weight.

14. The process as claimed in claim 1, wherein the extraction of water occurs at a temperature of 0° C. to 200° C.

15. The process as claimed in claim 1, wherein the extraction of water occurs at a temperature from 5° C. to 100° C.

16. The process as claimed in claim 1, wherein the extraction of water occurs at a temperature from 30° C. to 50° C.

17. The process as claimed in claim 1, wherein the extraction of water occurs at a pressure the range from $10^{-3}$ to 10 MPa.

18. The process as claimed in claim 14, wherein the extraction of water occurs at a pressure the range from $10^{-3}$ to 10 MPa.

19. The process as claimed in claim 15, wherein the extraction of water occurs at a pressure the range from $10^{-2}$ to 1 MPa.

20. The process as claimed in claim 16, wherein the extraction of water occurs at a pressure the range from $5 \times 10^{-2}$ to $5 \times 10^{-1}$ MPa.

* * * * *

UNITED STATES PATENT AND TRADEMARK OFFICE
CERTIFICATE OF CORRECTION

PATENT NO. : 7,407,643 B2 Page 1 of 1
APPLICATION NO. : 10/519513
DATED : August 5, 2008
INVENTOR(S) : Tim Jungkamp et al.

It is certified that error appears in the above-identified patent and that said Letters Patent is hereby corrected as shown below:

Title Page,

In the Reference Cited under the Foreign Patent Documents read "EP 0 732 922 6/1990" and should read -- EP 0 372 922 6/1990 --

Signed and Sealed this

Thirtieth Day of September, 2008

JON W. DUDAS
*Director of the United States Patent and Trademark Office*